United States Patent
Gorman

(10) Patent No.: US 6,884,470 B2
(45) Date of Patent: Apr. 26, 2005

(54) APPLICATION METHOD FOR ABRADABLE MATERIAL

(75) Inventor: Mark D. Gorman, West Chester, OH (US)

(73) Assignee: General Electric Company, Schenectady, NY (US)

(*) Notice: Subject to any disclaimer, the term of this patent is extended or adjusted under 35 U.S.C. 154(b) by 347 days.

(21) Appl. No.: 10/264,052

(22) Filed: Oct. 3, 2002

(65) Prior Publication Data

US 2004/0067317 A1 Apr. 8, 2004

(51) Int. Cl.[7] .............................. B05D 1/32; C23C 4/02
(52) U.S. Cl. ...................... 427/448; 427/452; 427/453; 427/454; 427/456; 427/248.1; 427/287; 427/282; 427/259; 427/343; 427/352; 427/354; 427/355; 427/405; 427/419.2; 427/419.3
(58) Field of Search ................................ 427/448, 452, 427/453, 454, 456, 287, 282, 259, 405, 419.2, 419.3, 343, 352, 354, 355, 248.1

(56) References Cited

U.S. PATENT DOCUMENTS

| | | |
|---|---|---|
| 3,975,165 A | 8/1976 | Elbert et al. |
| 3,993,844 A | 11/1976 | Kiger et al. |
| 4,001,930 A | 1/1977 | Tank et al. |
| 4,314,827 A | 2/1982 | Leitheiser et al. |
| 4,593,007 A | 6/1986 | Novinski |
| 4,610,698 A | 9/1986 | Eaton et al. |
| 4,639,388 A | 1/1987 | Ainsworth et al. |
| 4,854,196 A | 8/1989 | Mehan |
| 4,916,029 A | 4/1990 | Nagle et al. |
| 5,024,884 A | 6/1991 | Otfinoski |
| 5,214,011 A | 5/1993 | Breslin |
| 5,223,332 A | 6/1993 | Quets |
| 5,626,914 A | 5/1997 | Ritland et al. |
| 5,658,614 A | 8/1997 | Basta et al. |
| 5,667,898 A | 9/1997 | Anderson et al. |
| 5,728,638 A | 3/1998 | Strange et al. |
| 5,997,248 A | 12/1999 | Ghasripoor et al. |
| 6,036,792 A | 3/2000 | Chu et al. |
| 6,235,370 B1 | 5/2001 | Merrill et al. |
| 6,428,280 B1 * | 8/2002 | Austin et al. ............ 416/241 B |
| 6,521,053 B1 * | 2/2003 | Grylls et al. ................ 148/280 |

* cited by examiner

Primary Examiner—Katherine A. Bareford
(74) Attorney, Agent, or Firm—Jonathan P. Miller; Carmen Santa Maria; McNees Wallace & Nurick LLC

(57) ABSTRACT

A method for applying a highly porous alumina material that is useful in the hot section of a jet aircraft engine. In order to apply the porous alumina, an aluminum-based metal/alumina material known in the art is first placed onto an aircraft engine component substrate. The aluminum-based metal is then dissolved using a solution that will not affect the alumina or the underlying substrate. The alumina is then washed with deionized water and dried. The aircraft engine component may be first masked by applying a non-porous metal oxide material to the component or by oxidizing the surface of the component. The resulting alumina has a porosity in the range of about 20% to about 45%. The alumina has globular interconnected surface features in the range of about 0.5 μm to about 20 μm.

15 Claims, 1 Drawing Sheet

APPLICATION METHOD FOR ABRADABLE MATERIAL

CROSS-REFERENCE TO RELATED APPLICATIONS

This Application is related to application Ser. No. 10/263,870, filed contemporaneously with this Application on Oct. 3, 2002, invented by Mark. D. Gorman, entitled "ABRADABLE MATERIAL FOR CLEARANCE CONTROL", assigned to General Electric Company the assignee of the present invention, and which is incorporated by reference herein.

FIELD OF THE INVENTION

The present invention is directed to a method of applying an abradable alumina material for clearance control for aircraft engine components.

BACKGROUND OF THE INVENTION

Modern aircraft are often powered by a propulsion system that includes a gas turbine engine housed within an aerodynamic streamlined nacelle. The major portions of an engine include a fan, compressor, combustor and turbine section. In the turbine portion of the engine, there are static parts and rotating parts. The static boundary at the tip of the rotating parts or blades are referred to as shrouds.

One of the most demanding materials applications in current technology is found in turbine components used in jet aircraft engines, which require high strength materials to operate in corrosive, oxidative environments at high operating temperatures. The higher the operating temperature of an engine, the greater its efficiency, and the more power it can produce from each gallon of fuel. There is therefore an incentive to operate such engines at as high a temperature as possible.

There has been an extraordinary amount of effort over the past 45 years to develop methods for applying materials that can be used in high temperature engine applications. The compositions of such materials are carefully designed to maintain their desirable properties during use at the high temperature of engine operations. The high pressure turbine shroud sections are comprised of materials that are tolerant to these high temperatures, which are in the neighborhood of 2000° F. to 2200° F., since such materials form a boundary for the flow of the hot gases of combustion.

Since the turbine shrouds are located within the turbine regions of the engine radially outboard and immediately adjacent of the blades, the turbine blades can rub against the shrouds. This rubbing wears away the interfering materials, the less abrasive material of the two experiencing greater wear, whether such material is part of the turbine blade or the opposed turbine shroud during high temperature operation and power excursions.

Shrouds that are subject to rubs from blade tips are made from various materials. These shrouds may be made with coatings or may be uncoated. The shrouds damage the blade tips if they are higher strength than the opposed turbine blade, and can cause excessive wear if the shroud surface is too abrasive. Frequently, the shrouds have poor environmental resistance due to processing steps taken to control initial geometric tolerances and clearances near the blade tips, as the tolerance between the blade tips and the shroud is desirably kept to a minimum in order to minimize the leakage of gas through the clearance between the blade tips and shroud. Blade replacement or repair is significantly more expensive and difficult than replacing the shroud, so it is desirable to provide a system which preferentially abrades the shroud rather than the blade tips. Finding a suitable compromise between blade life and shroud life has been difficult, particularly in engine hot section application.

The high pressure turbine shroud, and the high pressure turbine blade form the portion of the flowpath where gas stream energy is converted to mechanical energy used to sustain engine operation. The high pressure turbine shroud includes a region known as the shroud or stator rub area, because it is in this section of the shroud where the turbine blades typically contact the shroud. If the stator or shroud rub area does not fit tightly to the blade tip, gas can escape in the gap between the shroud and blade tip without imparting its energy with the rotor. Such a poor fit creates a loss of engine efficiency.

Previously, the problem of how to seal the stator or shroud rub areas and the blade tips have been addressed in a number of different ways. Bare shrouds have been used. These bare shrouds typically have been comprised of expensive high strength superalloys. These alloys alone, while engineered to survive in a hot turbine, have insufficient environmental protection to prevent severe environmental attack for long term service in the turbine portion of a gas turbine engine. In addition, because of their strength, they can cause blade damage.

Shrouds may be manufactured with environmental coatings. However, these coatings can cause blade wear, complicate subsequent repair, and interfere with establishing the desired tight initial dimensional tolerance. Finally, blades may be manufactured with abrasive tips, however such blades are difficult to produce and provide only temporary protection. Such blade tips have a very short life at operating temperatures. The rub area of the shroud is generally abraded to a greater extent than the expected reach of the blades because of the natural thermal expansion of the blades relative to the stator due to high temperature operation, unbalance loads, and large maneuver loads, particularly during take-off and landing. Thus, at lower operating temperatures, such as those experienced at cruise speed, the rubbed area can result in a larger gap between the blades and the shroud.

Ceramic coatings are applied as thermal insulation for metal superalloy parts. These ceramic coatings, when used in combination with an environmental coating, protect the substrate alloy from rapid oxidation and corrosion caused by the flow of hot engine gases over the alloy. In the past, ceramic coatings, such as zirconium oxide ($ZrO_2$) and aluminum oxide ($Al_2O_3$), otherwise known as alumnina, have been applied to stator rub areas of the shroud using a thermal spray process. However, the processes used to deposit the ceramics have produced a dense layer that is not very porous. Such a dense layer is extremely abrasive and has a tendency to wear away the turbine blade tips that come into contact with it.

Recent developments in the field of surface treatments to metal and intermetallic substrates have led to the development of a new type of metal/metal oxide wear material. The various forms of this wear material are capable of withstanding a variety of high temperature erosive and corrosive environments. In one of these types of wear materials, the composition is a blend of aluminum and alumina.

However, the aluminum/alumina wear material does not have the physical and chemical properties that would lend the aluminum/alumina wear material to be an effective wear material for stator wear areas. The aluminum/alumina material is rather abrasive and is not an effective thermal barrier coating, since the metal phase has high thermal conductivity. In addition, the metallic component of the material would melt as the operating temperature of the engine is approached, the melting temperature of aluminum being about 1220° F.

Because of the problems with existing aluminum/alumina wear materials, and difficulties with ceramic densities deposited with existing thermal spray processes, there is a continuing need for further improvements to methods of applying stator rub materials. The present invention fulfils this need and further provides related advantages.

SUMMARY OF THE INVENTION

The present invention provides a method for applying a porous alumina rub material that initially is applied as a prior art aluminum/alumina (or an aluminum alloy/alumina) wear coating that can be applied to various aircraft engine components, including jet aircraft engine turbine stator or shroud assemblies and labyrinth seals. Applying the material directly to the aircraft engine component is required because the alumina without the aluminum has insufficient mechanical capability to be used for any purpose other than as a wear material coating. In addition to pure aluminum, the metal phase in the aluminum/alumina wear coating may include metals such as zinc, silicon, copper, iron, nickel, cobalt, magnesium, titanium, tantalum, tungsten, yttrium, niobium, zirconium, and hafnium to aid in the leaching of the aluminum. Applying the modified aluminum/alumina material to a shroud results in a shroud coating with improved abradibility, which can function as a thermal barrier material.

Accordingly, the present invention provides a method for applying an abradable porous alumina coating to aircraft engine components such as high-temperature shroud areas that require materials having both high abradability and thermal resistance. While such shrouds are a particularly good application for the present invention, shrouds are not the only application for the present invention.

Since one of the method steps of the present invention involves reacting a molten aluminum-based alloy with an aircraft engine component, masking the component prior to reacting the sacrificial ceramic material with the molten aluminum-based alloy may be necessary. While some aircraft engine components will benefit from the aluminiding that occurs when the surface of the components are contacted with molten aluminum-based metal, other components, or areas of the component, will be damaged by such aluminiding. Allowing certain portions of the surface of the component to be aluminided will provide addition environmental protection. However, by aluminiding other components, and portions of components, fatigue strength and dimensional control will be adversely affected. For the components, and portions of components, that will be damaged by aluminiding, masking the areas for which aluminiding is undesirable is necessary.

The aircraft engine component may be masked to prevent aluminiding in a number of ways. Many alloys used in aircraft engine components are "alumina formers," that is, a component formed of superalloys that include aluminum as an alloying element that form an oxide film that is predominantly alumina. Other types of aircraft engine components are "chromia formers," that is a component formed of superalloys that form an oxide film that is predominantly chromia. Some environmental coatings, such as MCrAlY and diffusion aluminide are also alumina formers. Thus, components, or portions thereof, which would otherwise be chromia formers, to which an MCrAlY or diffusion aluminide environmental coating has been applied will also be considered an alumina former. One method of masking is to preheat the aircraft engine component in an oxygen-containing atmosphere at a preselected elevated temperature in the range of about 1500° F. to about 2350° F. for a preselected period of time in the range of about 30 seconds to about 24 hours to cause the surface of the component to oxidize and form a thin layer of metal oxide on the surface. The length of time required is dependent on the alloy composition of the aircraft engine component and the temperature selected. Under certain circumstance, the aircraft engine component may be heated for more than 24 hours, but such a situation would be unusual. For lower temperatures, a longer period of time will be required to cause the formation of a layer of metal oxide sufficient to prevent aluminiding. Only aircraft engine components that are alumina formers can be masked in such a manner, as alumina will form a good barrier to molten aluminum, while chromia will not form a good barrier. The component may then be grit blasted on the area or areas where aluminiding is desirable to remove the oxide from preselected portions of the surface of the component. A second method of masking is to apply a layer of metal oxide to the portion of the aircraft engine component where aluminiding is undesirable, provided that the metal oxide is non-porous and non-reactive in the presence of aluminum-based metal at about 300° C. or higher above its melting point. The metal oxide application method may be thermal spray, physical vapor deposition, such as sputtering or ED-PVD, or any other suitable method. The metal oxide that is applied in such a fashion may be alumina, zirconium oxide, magnesium oxide, calcium oxide, or any other suitable metal oxide that is stable in the presence of molten aluminum. Such suitable metal oxides include the entire group of metal oxides that are more thermodynamically stable than silica.

The prior art aluminum/alumina wear material is applied to a predetermined thickness to the surface of a turbine shroud that will be exposed to the hot gases of combustion of a turbine engine. The aluminum/alumina wear material has a structure that provides interwoven interdispersed phases of aluminum and alumina, wherein each of the phases is also substantially continuous. Generally, the aluminum/alumina wear material is an abrasive material.

Since the prior art aluminum/alumina wear material is unsuitable for use in turbine shroud rub areas, as it is abrasive, the metallic phase comprising aluminum (or aluminum alloy) must be removed from the alumina leaving a porous alumina, the porosity caused by displacement of the metallic phase. The aluminum is removed by washing the aluminum/alumina wear material with a solution that will dissolve or leach the aluminum, yet not substantially affect the alumina or the underlying substrate. The aluminum phase may be an alloy that contains zinc, copper, silicon, iron, nickel, cobalt, magnesium, titanium, tantalum, tungsten, yttrium, niobium, zirconium, or hafnium in order to increase the rate of leaching. Such leaching solutions include sodium hydroxide and nitric acid, but may include any suitable solution that effectively dissolves the metallic phase without affecting the alumina portion of the structure or the substrate material.

After removal of the aluminum with a suitable treatment, the coated aircraft engine component is treated with a suitable treatment to remove or neutralize any remaining solution.

An advantage of the present invention is that it allows an alumina coating, which is highly porous, to be applied to an aircraft engine component.

A further advantage of the present invention is that it is allows the application of an abradable wear material that is light in weight, resulting in weight reduction as compared to conventional abradable ceramic coatings.

Another advantage of the present invention is that it allows the application of a wear material that provides excellent thermal protection to the underlying substrate alloy, the porosity contributing to thermal resistance.

Another advantage of the application method of the present invention is that film cooling or transpiration cooling can effectively be applied to it because of its porosity, if desired.

Still another advantage of the present invention is that it allows the alumina wear material to be applied over an environmental coating, such as diffusion aluminide or an MCrAlY alloy, applied to the shroud. When applied to a sufficient thickness, the coating applied by the present invention will be abraded by the rotating turbine tips in the rub area and yet will leave the underlying shroud material protected by the environmental coating.

A further benefit of the present invention is that the coating applied by the method of the present invention, while continuous, is sufficiently porous so as to be reduced in strength whereby the blades will abrade the coating with little or no effect on the blade tip.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
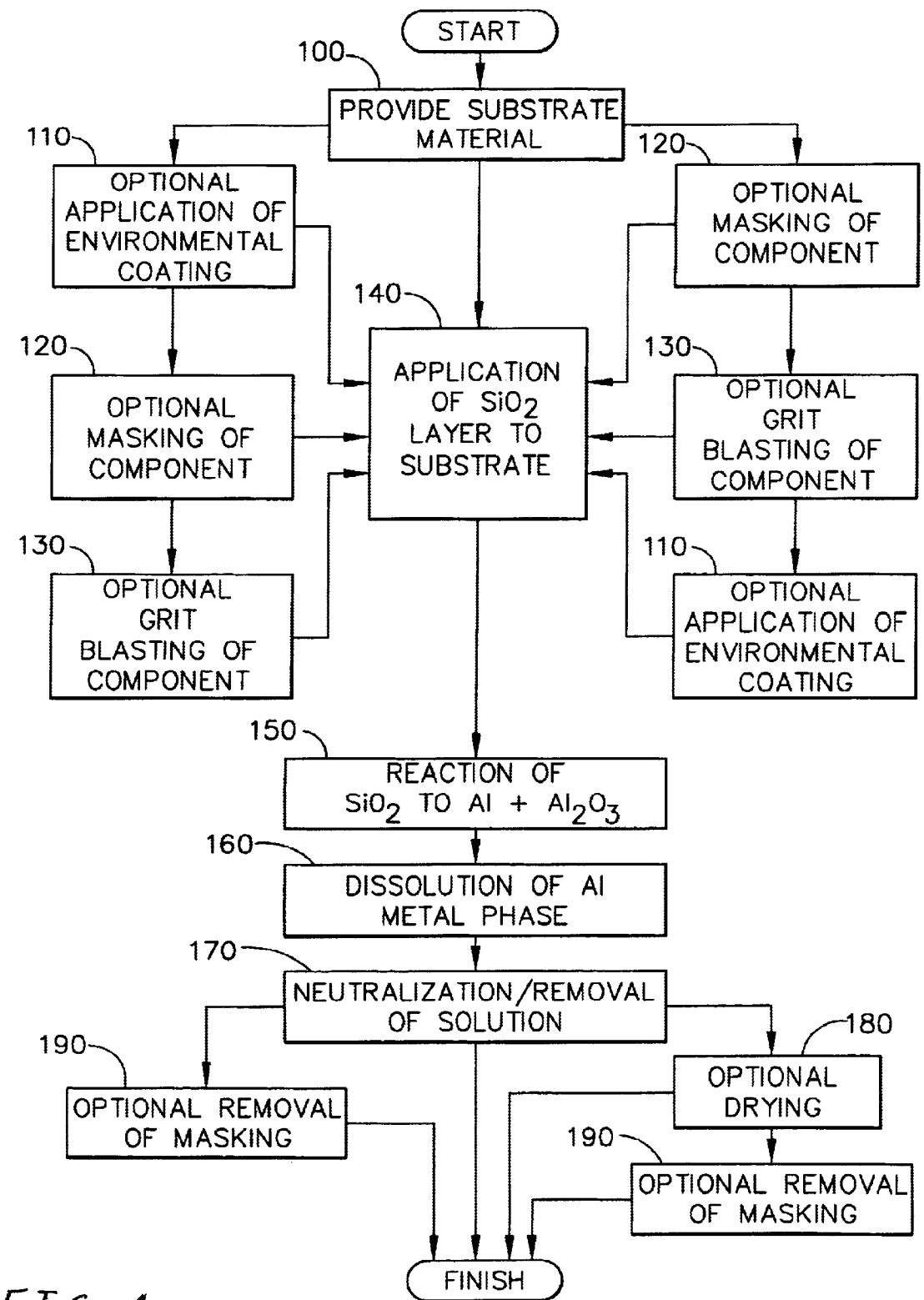
FIG. 1 is a process step illustrating the manufacture of the alumina material of the present invention.

Referring now to FIG. 1 there is shown the method of the present invention for applying a porous alumina coating to an aircraft engine component at least a portion of which comprises a metallic substrate material. The initial step of the process 100 is the provision of an aircraft engine component. The optional next step of the process is the application of an environmental coating to the aircraft engine component, or any preselected portions of the component, such as MCrAlY or diffusion aluminide, among others 110. The optional next step of the process is masking any preselected portions of the aircraft engine component that would be adversely affected by aluminiding when the molten aluminum alloy is applied in accordance with the methods of the present invention by heating the aircraft engine component in an oxygen containing atmosphere to a preselected temperature in the range of about 1500° F. to about 2350° F. for a preselected period of time. Such a preselected time will generally be in the range of about 30 seconds to about 24 hours, depending on the composition of the aircraft engine component and the temperature selected. The heating causes a metal oxide film of preselected desired thickness to form on the outer surface of the aircraft engine component 120. Such a method of masking will only be effective if the aircraft engine component, or environmental coating, is an alumina former. In an alternative embodiment, the masking of any aircraft engine component, including chromia forming components, or any preselected portions of the component, may be accomplished by applying a layer of metal oxide to the portion of the aircraft engine component to which aluminiding is not desired, provided that the metal oxide is non-porous and non-reactive in the presence of molten aluminum-based metal about 300° C. or higher above its melting point. The metal oxide that is applied in such a fashion may be alumina, zirconium oxide, calcium oxide, magnesium oxide, or any other suitable metal oxide that is stable in the presence of molten aluminum-based metal such a suitable metal oxide being more thermodynamically stable than silica. The optional next step of the process is grit blasting a preselected portion of the metal oxide off of the surface of the aircraft engine component 130 to expose those portions of the substrate metal. The next step of the process is the application of a sacrificial ceramic layer to the substrate material, wherein the sacrificial ceramic layer is selected from the group consisting of silica, quartz, mullite, silicate glass, fluorosilicate glass, fluoroborosilicate glass, aluminosilicate glass, calcium silicate glass, calcium aluminum silicate glass, calcium aluminum fluorosilicate glass, and combinations thereof. In a preferred embodiment, the sacrificial ceramic layer is silica ($SiO_2$) 140 of a composition applied as set forth in U.S. Pat. Nos. 5,214,011 and 5,728,638, which are incorporated herein by reference. In another preferred embodiment, the sacrificial ceramic layer is polycrystalline silica. In another preferred embodiment, the sacrificial ceramic layer is amorphous silica. The next step of the process is the application of a composite layer comprising aluminum and alumina on the substrate material by reacting the sacrificial ceramic layer with molten aluminum or a molten metal alloy comprising aluminum, that is, an aluminum-based metal, whereby a composite layer comprising alumina and aluminum is formed, whereby the sacrificial ceramic layer at least partially oxidizes the aluminum to form an alumina ceramic component of as an aluminum/alumina layer, and wherein molten aluminum flows into alumina ceramic component, and wherein the sacrificial ceramic layer is at least partially reduced, whereby an aluminum/alumina composite layer is produced, possessing a near net shape of the sacrificial ceramic layer. The molten aluminum-based metal reduces the silica in the ceramic layer to silicon, which is then dissolved into the molten aluminum-based metal. The molten aluminum or molten aluminum alloy is at least 300° C. above its melting point, but below the softening point of the sacrificial ceramic layer. The optional step 110 of applying an enviromnental coating to the component may occur directly before the step 140 of applying the sacrificial ceramic, preferably silica, layer to the substrate material. The optional step 120 of masking the component may also occur directly before the step 140 of applying the sacrificial ceramic, preferably silica, layer to the substrate material. The optional step 130 of grit blasting the component may also occur directly before the step 140 of applying the sacrificial ceramic, preferably silica, layer to the substrate material.

In an alternative embodiment, the optional step 120 of masking the component may occur directly after the provision of an aircraft engine component at least a portion of which comprises a metallic substrate material. The next step 140 in the process is then the application of the sacrificial ceramic layer to the substrate material.

In another alternative embodiment, the optional step 120 of masking the component may occur directly after the provision of an aircraft engine component at least a portion of which comprises a metallic substrate material. The next optional step 130 is the grit blasting of the component The next optional step 140 in the process is then the application of the sacrificial ceramic layer to the substrate material.

In another alternative embodiment, the optional step 120 of masking the component may occur directly after the provision of an aircraft engine component at least a portion of which comprises a metallic substrate material. The next optional step 130 is the grit blasting of the component. The next optional step 110 is the application of the enviromnental coating to the component The next step 140 in the process is then the application of the sacrificial ceramic layer to the substrate material.

In a preferred embodiment, an $SiO_2$ precursor layer reacts with molten aluminum-based metal to form an alumina/metal composite layer 150 as set forth in U.S. Pat. Nos. 5,214,011 and 5,728,638. In a preferred embodiment, a characteristic of the aluminum/alumina composite is that the aluminum matrix and alumina matrix are both substantially continuous, yet interlocked, so that no substantial amount of aluminum is entrapped within the alumina as the aluminum is removed from the structure. The aluminum/alumina composite material is about 20 percent to about 45 percent metallic aluminum, with the balance being alumina. In a preferred embodiment, the aluminum/alumina composite material is about 30 percent to about 40 percent metallic aluminum, with the balance being alumina The next step of the process 160 is the washing of the aluminum/alumina layer in a leaching solution which dissolves the aluminum, without substantially affecting the substrate or alumina, leaving only a substantially continuous porous layer of alumina behind. The next step 170 is washing the alumina in a neutralizing solution in order to remove any contaminants or leaching solution remaining in the alumina from the dissolution step followed by washing the article with deionized water to remove any neutralizing solution or leaching solution remaining on the coated substrate. If the leaching solution used is an acid, then a basic solution should be used to neutralize the leaching solution. If the leaching solution used is a base, then an acidic solution should be used to neutralize the leaching solution. The optional next step 180 is drying the alumina in order to remove any neutralizing solution and/or deionized water left within the alumina. The result of this process is an aircraft engine component, with preselected areas aluminided, coated with highly porous alumina that is useful as a wear material on aircraft engine components. The optional next step 190 is the removal of the optional non-porous metal oxide masking layer using grit blasting or any other suitable method as known to one skilled in the art. The optional step 190 of removing the masking layer may occur immediately after the step 170 of washing the alumina.

The alumina that is applied by this process has a number of characteristics that are very desirable for use in stator rub areas and labyrinth seals. First, the alumina applied by the present invention is very porous, in the range of about 20 percent porosity to about 45 percent porosity. The features of the alumina are globular and includes porosity having a size range of about 0.5 microns to about 20 microns. In a preferred embodiment, the alumina has about 30 percent porosity to about 40 percent porosity. This high level of porosity directly affects the abradability of the alumina. As alumina becomes more porous, it becomes weaker and more abradable. Generally, the alumina applied by the present invention is an abradable material. Very dense alumina is very abrasive, being used in applications such as grinding wheels, while porous alumina is very abradable. Since the porous alumina is abradable, rather than abrasive, the porous alumina will not wear away blade tips as severely or as rapidly as dense alumina. Second, the alumina is thermodynamically stable at the temperature ranges in which jet aircraft engines operate, which means that the alumina will not react in the high temperature environment of a turbine with either the hot gases or the underlying substrate.

In addition to the properties of abradability, the alumina applied by the present invention will also offer some thermal protection to the substrate to which it is applied. Alumina is a poor conductor of beat and therefore protects the substrate from the hot gases flowing through the jet aircraft engine. This thermal protection will increase the length of time that the substrate will be able to be kept in service without the need for a shop visit. The shroud is easily repaired and requires no special processing beyond the processing set forth in FIG. 1. If desired, air cooling can be added to the shroud, so the continuous nature of the porosity after removal of the aluminum provides an effective flow path for cooling air through the coating.

The application of the alumina wear coating is not limited to aircraft engine shrouds. Many metallic aircraft engine components will benefit from the application of the alumina wear coating. The alumina will work particularly well with cobalt-based, nickel-based, iron-based superalloy aircraft engine components, or combinations thereof. In addition to stator shrouds, another aircraft engine component that will benefit from the alumina wear material is a labyrinth seal, where the ceramic wear coating is applied to the abradable surface of the labyrinth seal at the interface between the labyrinth teeth and the labyrinth abradable seal area. In a preferred embodiment, the thickness of the alumina wear material will be greater than the expected interference from other aircraft engine components, such as blades, due to thermal expansion and normal maneuver loads.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A process for applying a ceramic wear coating material to an aircraft engine component comprising the steps of:

providing an aircraft engine component, of which at least a portion comprises a metallic substrate material, masking a preselected portion of the metallic substrate material by heating the aircraft engine component to a preselected temperature in the range of about 1500° F. to about 2350° F. for a preselected period of time prior to applying the sacrificial ceramic layer, wherein said heating forms a metal oxide film of preselected desired thickness on the outer surface of the metallic substrate material;

applying a sacrificial ceramic layer to a preselected portion of a surface of the metallic substrate material, wherein the sacrificial ceramic layer is selected from the group consisting of silica, quartz, mullite, silicate glass, fluorosilicate glass, fluoroborosilicate glass, alumninosilicate glass, calcium silicate glass, calcium aluminum silicate glass, calcium aluminum fluorosilicate glass, and combinations thereof;

providing a reactive molten aluminum-based metal;

contacting the applied sacrificial ceramic layer with the molten aluminum-based metal, wherein the reactive aluminum-based metal is at least about 300° C. above its melting point, but below the softening point of the sacrificial ceramic layer, whereby a composite layer comprising alumina and aluminum-based metal is formed by a reduction reaction of the molten aluminum-based metal and the sacrificial ceramic layer to form a composite layer comprising an alumina ceramic component and aluminum-based metal, as the sacrificial ceramic layer is at least partially reduced, whereby the aluminum-based metal/alumina composite layer is a near net shape of the sacrificial ceramic layer; and leaching out the aluminum-based metal from the layer of aluminum-based metal/alumina composite, while avoiding leaching out metallic substrate material from the aircraft engine component, leaving a porous alumina layer.

2. The process of claim 1, wherein the process further comprises the additional step of:

after the step of masking, grit blasting a second preselected portion of the metal oxide film to expose a portion of the metallic substrate material so that the second preselected grit-blasted portion of the metallic substrate material can be environmentally coated.

3. The process of claim 2, wherein the applied sacrificial layer is silica.

4. The process of claim 2, wherein the process further includes the additional step of:

applying an environmental coating to the aircraft engine component after the step of masking.

5. The process of claim 4, wherein the step of applying an environmental coating includes spraying a MCrAlY coating on the exposed metallic substrate material.

6. The process of claim 4, wherein the step of applying an environmental coating includes forming an aluminided coating on the exposed metallic substrate material.

7. The process of claim 6, wherein the aluminide coating is formed as the metallic substrate material is contacted by the molten aluminum-based metal.

8. The process of claim 2, wherein the process further includes the additional steps of:

washing the porous alumina layer in a neutralizing solution after the aluminum-based metal is leached out of the aluminum-based metal/alumina layer; and drying the alumina layer.

9. The process of claim 1, wherein the process further comprises the steps of:

washing the porous alumina layer in a neutralizing solution after the aluminum-based metal is leached out from the composite layer; and then drying the alumina layer.

10. A process for applying a ceramic wear coating material to an aircraft engine component comprising the steps of:

providing an aircraft engine component, of which at least a portion comprises a metallic substrate material;

masking a preselected portion of the metallic substrate material by applying a layer of metal oxide to it prior to applying the sacrificial ceramic layer, said metal oxide being non-porous and non-reactive in the presence of an aluminum-based metal about 300° C. or higher above its melting point;

applying a sacrificial ceramic layer to a preselected portion of a surface of the metallic substrate material, wherein the sacrificial ceramic layer is selected from the group consisting of silica quartz, mullite, silicate glass, fluorosilicate glass, fluoroborosilicate glass, aluminosilicate glass, calcium silicate glass, calcium aluminum silicate glass, calcium aluminum fluorosilicate glass, and combinations thereof;

providing a reactive molten aluminum-based metal;

contacting the applied sacrificial ceramic layer with the molten aluminum-based metal, wherein the reactive aluminum-based metal is at least about 300° C. above its melting point but below the softening point of the sacrificial ceramic layer, whereby a composite layer comprising alumina and aluminum-based metal is formed by a reduction reaction of the molten aluminum-based metal and the sacrificial ceramic layer to form a composite layer comprising an alumina ceramic component and aluminum-based metal, as the sacrificial ceramic layer is at least partially reduced, whereby the aluminum-based metal/alumina composite layer is a near net shape of the sacrificial ceramic layer; and leaching out the aluminum-based metal from the layer of aluminum-based metal/alumina composite, while avoiding leaching out metallic substrate material from the aircraft engine component, leaving a porous alumina layer.

11. The process of claim 10, wherein the non-porous metal oxide layer is applied using an application process selected from the group consisting of thermal spray processes and physical vapor deposition.

12. The process of claim 11, wherein the layer of non-porous metal oxide is selected from the group consisting of alumina, zirconia, calcia, magnesia, and combinations thereof.

13. The process of claim 10, wherein the applied sacrificial layer is silica.

14. The process of claim 10, wherein the process further includes the additional step of:

applying an environmental coating to the metallic substrate material prior to the step of masking.

15. The process of claim 10, wherein the process further includes the additional steps of:

washing the porous alumina layer in a neutralizing solution after the aluminum-based metal is leached out of the aluminum-based metal/alumina layer; and drying the alumina layer.

* * * * *

UNITED STATES PATENT AND TRADEMARK OFFICE
CERTIFICATE OF CORRECTION

PATENT NO. : 6,884,470 B2
DATED : April 26, 2005
INVENTOR(S) : Gorman, Mark D.

It is certified that error appears in the above-identified patent and that said Letters Patent is hereby corrected as shown below:

Column 8,
Line 50, "material," should be -- material; --.

Column 10,
Line 11, "silica quartz" should be -- silica, quartz --.
Line 21, "point but" should be -- point, but --.

Signed and Sealed this

Fourteenth Day of February, 2006

JON W. DUDAS
*Director of the United States Patent and Trademark Office*